UNITED STATES PATENT OFFICE.

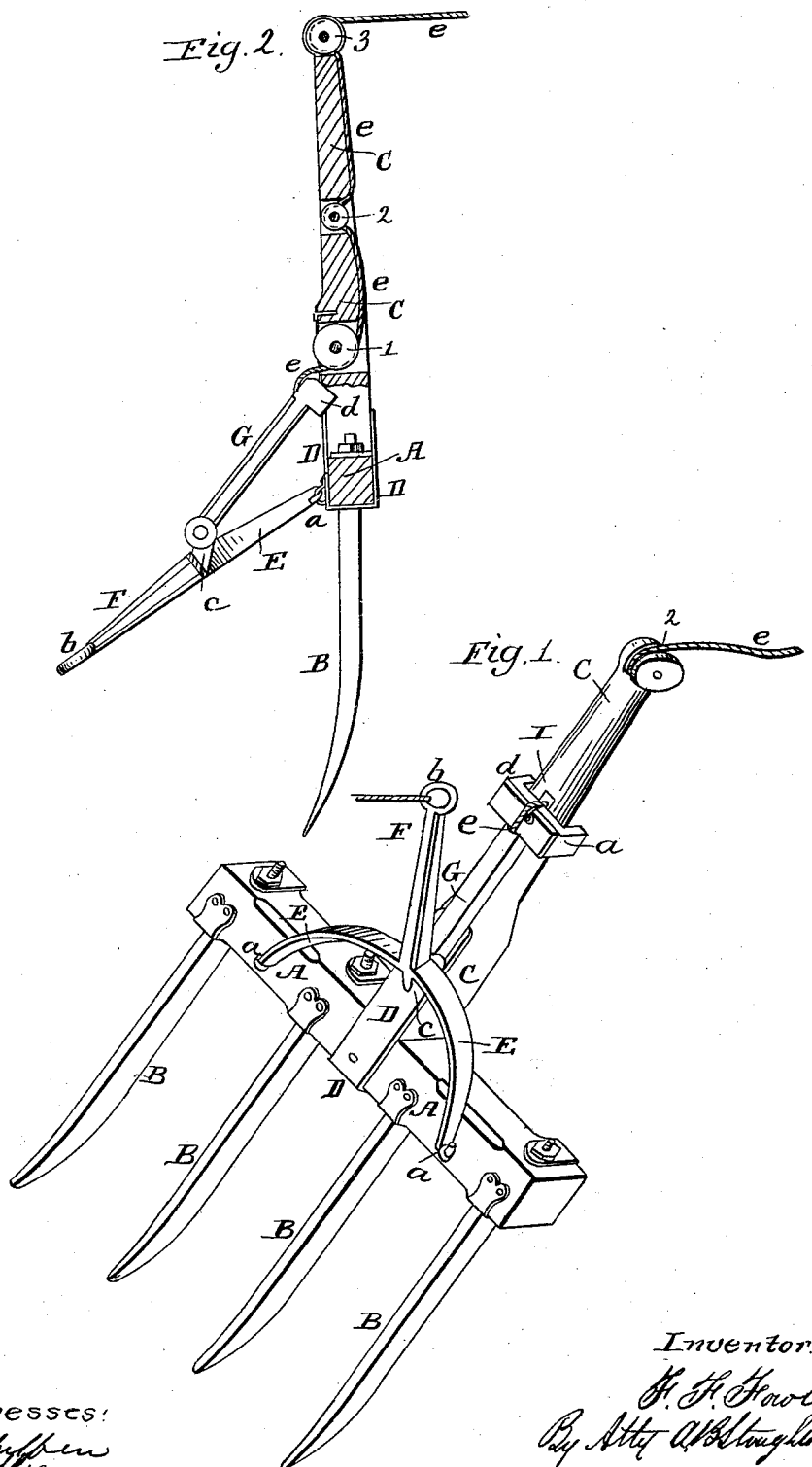

F. F. FOWLER, OF UPPER SANDUSKY, OHIO.

IMPROVEMENT IN HORSE HAY-FORKS.

Specification forming part of Letters Patent No. 57,114, dated August 14, 1866.

*To all whom it may concern:*

Be it known that I, FINDLEY F. FOWLER, of Upper Sandusky, in the county of Wyandot and State of Ohio, have invented certain new and useful Improvements in Forks for Elevating Hay, &c.; and I do hereby declare the following to be a full, clear, and exact description of the same, reference being had to the accompanying drawings, making a part of this specification, in which—

Figure 1 represents a perspective view of the fork, and Fig. 2 represents a section through the same.

Similar letters of reference where they occur in the separate figures denote like parts of the fork in both.

My invention consists in locking or bracing the fork when carrying its load through the intervention of the rope or cord by which the fork is guided and directed and also tripped to deliver its load.

To enable others skilled in the art to make and use my invention, I will proceed to describe the same with reference to the drawings.

A represents a fork-head, in which the tines B are set and secured in any of the usual well-known ways.

C is a handle, permanently secured to the fork-head A by tenon and mortise and strap D.

To dead-eyes *a a* in the fork-head the bail E is pivoted and hung, and to the center of the bail is united a lever or arm, F, having a ring or eye, *b*, in its end, where the hoisting-rope is attached, and opposite to this lever or arm F, and on the under side of the bail, there is a small projecting arm, *c*, to which the brace G is pivoted.

The free end of the brace G has a shoe, *d*, upon it, which partially straddles the handle C to guide it properly.

To the end of the brace G is fastened a cord, *e*, which passes over and under pulleys 1, 2, and 3, arranged in the handle C, and as follows, viz: Under pulley 1, thence to and over pulley 2, and thence to and over pulley 3, and thence to the hands of the attendant or operator. By drawing upon the cord *e* the shoe *d* is drawn to the first roller, and there held so long as the cord is kept taut. When the fork is to deliver its load it is only necessary to let go the cord *e*, and the load upon the tines immediately dumps the fork, and the load is dropped.

Having thus fully described my invention, what I claim as new, and desire to secure by Letters Patent, is—

Locking and releasing the brace G by means of the cord or rope *e*, which is also the guiding and directing rope of the fork, substantially as described.

F. F. FOWLER.

Witnesses:
   A. B. STOUGHTON,
   EDM. F. BROWN.